Aug. 13, 1935. D. REPONY ET AL 2,010,894
BELT
Original Filed Sept. 2, 1932

Inventors
Daniel Repony and
John H. Matthews
BY
ATTORNEY

Patented Aug. 13, 1935

2,010,894

UNITED STATES PATENT OFFICE 2,010,894

BELT

Daniel Repony, Clifton, and John H. Matthews, Nutley, N. J., assignors to Raybestos-Manhattan, Inc., Passaic, N. J., a corporation of New Jersey Original application September 2, 1932, Serial No. 631,488. Divided and this application December 15, 1933, Serial No. 702,496

2 Claims. (Cl. 74—232)

This invention relates to a power transmission device and to a power belt. More particularly, the invention contemplates a laminated belt and a power transmission device including such belt, in which successive portions of the belt through its thickness are varied in length or in capacity for stretch so as to equalize stresses within the belt when it is flexed over a pulley.

This invention is a division of our application Ser. No. 631,488, filed September 2, 1932, now Patent No. 1,978,912, in which we have described and claimed a method and apparatus particularly suitable for the manufacture of belts embodying the present invention.

Although the art of making belts for power transmission is one which is almost as old as power-driven machinery, and although for nearly seventy-five years laminated belts have been made by cementing together with rubber layers of cloth, such as canvas duck, there has, during all this time prior to our invention, been considerable difficulty experieneced with such belts, due to ply separation. It has been suggested for many years before our invention that this ply separation, "bootlegging" as it is called, is due at least in part to the alternating strain resulting from the passage of the belt successively over the curved pulleys and along a straight path between the pulleys. Nevertheless, no satisfactory way has been discovered by which this alternating strain could be avoided, and the difficulty with ply separation has continued.

Other difficulties which heretofore have been inherent in such belts and have seriously limited their useful life are the pulling out of fasteners, whether stitching, splicing, or metallic fasteners, and the breaking of outside plies or of warp threads in the outside plies. All of these we have overcome by the present invention.

It is, accordingly an object of the present invention to provide a belt which is relieved from destructive stresses produced by the alternate flexing from straight to curved condition and back again, and which, by reason thereof, will substantially avoid ply separation and rapid deterioration, and which will, therefore, have a very much greater useful life. A further object of our invention is to provide a belt which may be made endless or in lengths to be cut and stapled, or spliced to form a belt of any desired length. A further object of our invention is to provide a belt which will hug the pulleys more closely, and which may therefore be operated to transmit a given power with lower bearing pressures or smaller pulley sizes than has heretofore been regarded as practicable.

We have now discovered that if a belt is made so that it has a natural curvature under operating tension similar to, or even, with some advantage, of shorter radius than, that of the pulley upon which it is to operate, its useful life is multiplied manyfold over that of the best of such belts made as before our invention.

According to our present invention, the belt is so designed and constructed that the greatest tension comes upon the inner layers, preferably at or near the face of the belt which is in contact with the pulley.

If the relative stretch and length of the successive layers are properly adjusted, having regard for the diameter of the driving pulley over which it is to run, the tension of all of the layers of the belt where they are curved around the pulley may be made approximately equal, although between pulleys the tension may be greatest upon the inner layers, and preferably the tension will be gradually concentrated upon the inner layers. This is as it should be, since the simple tension to which the belt is subjected between pulleys is easily withstood as compared to the destructive forces which occur when an ordinary laminated belt is driven over a pulley.

As the natural curvature of the belt approaches the diameter of the pulley, destructive tendencies are lessened; and, although certain advantages of our invention, as for example the hugging of the pulleys by the belt, occur more fully when the natural curvature at the operating tension becomes sharper than that of the pulley, nevertheless, other advantages, notably reduction of destructive internal strains in the belt, will be largely taken advantage of before the curvature actually reaches that of the pulley.

We are aware that prior to our invention belts have been made in which the outer layers were to some extent longer than the inner layers, e. g., by winding a fabric onto a drum; but although this affords a convenient method of manufacture, it is not intended to, and in fact does not relieve the outer layers of the belt from the maximum stress and tension, nor prevent the destructive shifting action when the belt is driven over a pulley. We are aware, also, that it has been suggested to manufacture endless laminated belts by wrapping the belt around a pair of pulleys so that each layer is successively longer than the preceding one. So far as we are aware, however, no belt has ever been made in which a satisfactory adjustment has existed throughout the length of the belt, that is, in which all parts of the belt as they come over the curvature of the pulley would have the stresses approximately balanced or the maximum stress and tension at or near the inner face of the belt.

In the accompanying drawing, we have illustrated a section of belting made according to our invention, and a power transmission device including the belt. These are intended to be only exemplary and are shown for the purpose of illustrating the principle and a preferred embodiment of the invention.

Figure 1:
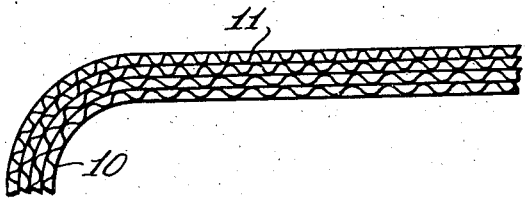
Fig. 1 is a longitudinal section of a belt embodying the present invention.
Figure 2:
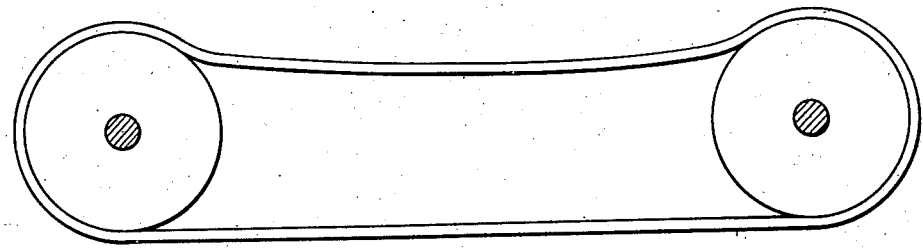
Fig. 2 is an elevation of a power transmission device embodying my invention.

Referring first to Fig. 1, in which we have shown a preferred embodiment of the belting made according to the present invention, it will be observed that in the curved portion indicated by the reference character 10, the successive layers of duck of which the belting is made show substantially equal crimp, whereas on the flat portion of the belt indicated by the reference character 11, the crimp of the warp in the outer layers is substantially greater than that of the inner layers. This is one way of securing the desired graduation in capacity for stretch. When the belting is made with the same or similar fabric in each of the layers, this effect may be obtained either by joining the layers on a curve or in other manner effecting a smooth adhesion between layers, one of which is slightly longer than the other, or by stretching the successive layers progressively more from the outer toward the inner face of the belt, and securing the layers together while the inner ones are thus stretched. Another simple method of attaining this result is to utilize for the successive layers fabrics which are specially woven or belting materials otherwise treated or chosen to provide successively more elongation under a given tension in successive layers.

In either case, the belt may be formed and vulcanized in a flat press, but in the case of stretching the fabric or securing it together on a curve, the finished belt will have a natural curvature when relaxed, whereas in the latter case, i. e., the use of fabrics manufactured to give varying stretch, the belt will tend to lie out flat when fully relaxed, but since under tension the outer layers will stretch more readily than the inner, this belt also will have, under tension, a natural curvature which will cause it to hug the pulleys in the same manner as belting made on a curve, or by progressive stretching of the inner layers of fabric, etc.

By natural curvature, we mean, of course, a tendency to assume a curved, rather than a flat, condition,—that is to say, the internal stresses will be most nearly balanced when the belt is in a certain curved form, rather than when it is straight, and this may be demonstrated by the relative magnitude of forces which are required to bend the belt toward and away from any given curvature under a given tension.

When the belt as illustrated, for example in Fig. 1, is put into service, it is found not only that it will serve very much longer without ply separation or other serious deterioration, but that because of its inherent tendency to hug the pulley, because of its natural curvature, it will transmit a given power with lighter bearing loads,—that is, with less tension between the pulleys, or with smaller pulleys than would be required under the practice which has heretofore been regarded as standard. If the pulleys over which the belt is to operate are laterally separated, it is advantageous to mount the belt so that the power is transmitted on the lower band of the belt. The upper band, running somewhat slack, will consequently tend to follow the pulley and to give more than 180° engagement between the belt and pulley, and when the upper band of the belt is slack, the force of gravity will reinforce this inherent tendency of the belt and give an even greater engagement.

It is also found that in service the primary load falls upon the inner plies of the belt. If the belt is properly designed for the pulleys on which it is used, the stretch of the outer plies which results from flexing around the pulleys will result in a tension upon those plies which will approximate, or will be progressively slightly less than, the tension on the inner plies. The tension will be distributed among the plies in proportion to their resistance to the amount of stretch which occurs. Where the outer plies stretch sufficiently easily, it follows that between the pulleys the power is transmitted primarily by the inner plies, supported to a lesser extent by the outer plies. This is in contrast, of course, to belts as made heretofore, in which the tension is greatest upon the outer plies, and particularly on the curvature around the pulleys the stretch of the outer plies is sharply increased, while the innermost plies are relaxed, or even compressed.

In referring above to the progressive increase in length or in capacity for stretch, etc., we do not intend to imply that it is essential that this change occur in every case from ply to ply. On the contrary, we have found it best to make the inner ply longer than would give a uniform progressive change, e. g., of substantially the same length and stretch as the next outer ply, and then to make the remaining plies successively longer, or with successively greater stretch as the outside of the belt is approached. In this way, the innermost ply, which is subjected to frictional wear on the surface of the pulleys, may be relieved from an important part of the tension which would be thrown thereon if the length of all plies were adjusted so that each is equally and progressively longer than the next, and the second ply of the belt may even take a greater part of the tension than the innermost ply which contacts with the face of the pulley. This is particularly important where the innermost layer is strictly a friction layer, e. g., as set forth in the co-pending applications of Daniel Repony, Serial Nos. 585,448 and 585,449, and of J. H. Matthews, Serial No. 585,443. Similarly, in some cases, other plies in the belt may be adjusted less or more than would be theoretically required. We have found that, except for the relief of the inner ply, it is ordinarily desirable to adjust fully the layers of the belt by regular and progressive increases from ply to ply of length or capacity for stretch.

As has already been suggested above, the belt of our invention embodying these characteristics may be made in various different ways. The first, which has been suggested above, is the utilization of different fabrics which, from an inner ply toward the outer when the belt is flat, each possesses a slightly greater capacity for stretch. When this expedient is adopted, the belt may be made substantially according to present practice, except that care should be taken that the plies with the greater capacities for stretch are not excessively stretched during the plying up process.

Another method of manufacturing the belt, as set forth more in detail in our co-pending application Serial No. 631,488, is to stretch the successive plies of fabric each a little more than the one before, before assembling them. With this method, the successive plies may be made of identical material, except as more or less of its capacity for stretch has been exhausted before it is combined into the structure of the belt. Another method which may be used is to combine the layers of the belt upon a curved surface so that the belt is given a natural curvature at the time of its assembly. Still another method is to give to the layers, as they are successively applied, a slight corrugation, each layer having a slightly greater corrugation than that of the one before. The layers may first be joined along the lines of corrugation, and may then be completely secured together, e. g., by vulcanizing in a belting press which flattens out the corrugations, or while rolled up under sufficient tension to stretch the belting straight, and flatten out the corrugations.

We are aware that numerous other apparatus and methods may be used for the manufacture of a belt according to our invention, and that many changes and modifications may be made from the above description and the annexed drawing without departing from the scope of our invention.

Where we have referred above to the layers, it is to be understood the layers referred to may be composed of more than one ply of the fabric. Although we have referred particularly in the above specification to rubber used as adhesive for cementing together the layers of the belt, it is to be understood that other adhesives may be used without departing from the scope of our invention. Thus, for example, in some cases pyroxylin has been used as a binder for laminated belts. Similarly we have referred to textile fabric for example of the material of the plies, but it is to be understood that any other belting materials may be used as will be obvious to those skilled in the art. Although the invention is of greatest advantage in power transmission belts, because of the relatively great stresses which result from the power applied to the belt, the invention is none the less applicable to other types of belting, as for example, conveyor belts, etc.

What we claim is:

1. A laminated belt comprised of successive layers of textile fabric cemented together with flexible adhesive, and the fabric of an outer layer having, when relaxed, a greater crimp in the longitudinal threads, thereof, than an inner layer and each layer having a relaxed length and capacity for stretch relative to that of the other such that the belt, when under normal operating tension, tends to assume a curvature approximating that of a pulley for which it is designed.

2. A power transmission belt consisting of a plurality of superposed layers of belting material, each successive layer, beginning near the pulley-engaging inner face and progressing toward the outer face, having progressively greater capacity for stretch under given tension when the belt is flat, and in which the length and capacity for stretch of said layers are so related that under a load for which the belt is designed and when flexed to the curvature of the pulley with which it is to be used the tension in said successive layers will be approximately equal.

DANIEL REPONY.
JOHN H. MATTHEWS.